(12) United States Patent
Mersmann et al.

(10) Patent No.: US 7,798,809 B2
(45) Date of Patent: Sep. 21, 2010

(54) METHOD FOR CONTROLLING THE OPERATION OF A BULK GOOD GRATE COOLER

(75) Inventors: Matthias Mersmann, Lichtenbusch (BE); Karl Schinke, Köln (DE); Thomas Binninger, Alpharetta, GA (US)

(73) Assignee: KHD Humboldt Wedag GmbH, Cologne (DE)

( * ) Notice: Subject to any disclaimer, the term of this patent is extended or adjusted under 35 U.S.C. 154(b) by 442 days.

(21) Appl. No.: 11/667,531

(22) PCT Filed: Nov. 3, 2005

(86) PCT No.: PCT/EP2005/011756

§ 371 (c)(1),
(2), (4) Date: Oct. 10, 2007

(87) PCT Pub. No.: WO2006/050851

PCT Pub. Date: May 18, 2006

(65) Prior Publication Data

US 2008/0187876 A1   Aug. 7, 2008

(30) Foreign Application Priority Data

Nov. 11, 2004  (DE) .................. 10 2004 054 417

(51) Int. Cl.
*F27D 15/02*  (2006.01)
(52) U.S. Cl. ................ 432/77; 110/281; 198/750.2
(58) Field of Classification Search .............. 432/77, 432/78; 110/268, 270, 281; 198/750.1, 750.2, 198/773
See application file for complete search history.

(56) References Cited

U.S. PATENT DOCUMENTS

| | | | | | |
|---|---|---|---|---|---|
| 3,064,357 | A | * | 11/1962 | Butters | 34/560 |
| 3,075,756 | A | * | 1/1963 | Gieskieng | 432/32 |
| 3,208,741 | A | * | 9/1965 | Wilhelm | 34/485 |
| 3,236,358 | A | * | 2/1966 | Gieskieng | 198/751 |
| 4,337,083 | A | * | 6/1982 | Sweat | 75/757 |

(Continued)

FOREIGN PATENT DOCUMENTS

DE        100 19 961       1/2002

(Continued)

*Primary Examiner*—Gregory A Wilson
(74) *Attorney, Agent, or Firm*—Greer, Burns & Crain, Ltd.

(57) ABSTRACT

A method of controlling the operation of a bulk good grate cooler for cooling hot cement clinker, for example, in a process-controlled manner is provided in order to ensure that the volume flows of cooling air in all areas of the cooling grate and/or the residence time in the respective area of the bed of the goods to be cooled can be matched to the cooling requirements occurring in each area. A control intervention is carried out during the operation of the grate cooler with respect to the respective local cooling air volume flow and/or with respect to the respective local speed of conveyance of cooling grid according to the respective bulk good bed height measured per area and/or the bulk good bed temperature and/or the cooling air through-flow resistance such that if a modification occurs in one or several of the measured parameters, i.e., bed height, bed temperature and through-flow resistance, the respective local cooling air volume flow and/or the conveyance speed of the grate system is altered.

19 Claims, 2 Drawing Sheets

U.S. PATENT DOCUMENTS

| | | | | |
|---|---|---|---|---|
| 5,149,266 | A | * | 9/1992 | Heinemann et al. ............ 432/77 |
| 5,871,348 | A | * | 2/1999 | Terry et al. .................... 432/78 |
| 6,036,483 | A | * | 3/2000 | Meyer et al. ................... 432/45 |
| 7,114,612 | B2 | * | 10/2006 | Meyer et al. ............. 198/750.2 |
| 2007/0199802 | A1 | * | 8/2007 | Meyer et al. ............. 198/750.3 |

FOREIGN PATENT DOCUMENTS

| | | |
|---|---|---|
| EP | 0 442 129 | 8/1991 |
| EP | 0 943 881 | 9/1999 |
| JP | 2001302294 | 10/2001 |

* cited by examiner

METHOD FOR CONTROLLING THE OPERATION OF A BULK GOOD GRATE COOLER

BACKGROUND OF THE INVENTION

The aim of the invention is to control the operation of a bulk good grate cooler to cool heated bulk goods such as cement clinkers that are transported from the bulk good inlet connection via suitable conveyors to the chilled goods discharge connection, while the cooling grid and the hot bulk goods distributed onto the grid are supplied with cooling air flow passed from the bottom up, which is regulated by control systems arranged beneath the cooling grid.

In a cement clinker production line, the hot cement clinker produced from calcinated raw meal by a rotary kiln is dropped from the discharge point of the kiln onto a cooling unit, usually onto the cooling grate of a grate cooler, onto which the clinker is distributed and transported by suitable conveyors in longitudinal direction to the cooler discharge point. During this process the cooling grate and the hot bulk material layer are essentially ventilated from bottom up by cooling air. In the following, some of the more well-known grate cooler types shall be briefly illustrated.

In the case of a reciprocating grate cooler, fixed grate plate sequences and reciprocal grate plate sequences alternate in the course of conveyance, all grate plates are furnished with cooling air vents and are essentially ventilated from bottom up by cooling air. By the joint oscillating movement of all movable grate plate sequences, the hot material to be cooled is transported batch-wise and cooled in the process.

An alternative to such reciprocating grate coolers is e.g. the grate cooler type EP-B-1 021 692 with which the cooling grate through which cooling air is passed is not movable, i.e. it is set. Numerous rows of adjoining reciprocal bar-shaped thrust elements are arranged above the cooling grate, which are moved between the pre-stroke position in the cooling material conveyance direction and the return stroke position, so that the reciprocating movement of these elements within the cooling bed successively move and cool the material from the cooler start point to its end point.

Irregular distribution in the hot bulk material bed in terms of height of bulk material bed, clinker grit size, temperature profile, etc. cannot always be avoided with these types of grate coolers, which in turn also causes irregular cooling. In cooling grate areas with a larger bulk material bed height there is an increase in flow through-flow resistance for cooling air, a decrease in flow velocity and less cooling air is passed through the bulk material bed. In the opposite sense, a low bulk material bed height means a decrease in the through-flow resistance of cooling air and an increase in flow velocity and blowout risk. Too much cooling air is passed through such bulk material bed areas that would require the lowest amount of cooling air.

It is therefore known that when implementing a grate cooler to cool hot bulk goods such as cement clinker (EP-B-0 848 646) the specific cooling air quantity should be adjusted automatically in the cooling air flow beneath the cooling grid, so that in the case of an increasing cooling air flow quantity, caused by a decrease in cooling material bed height and flow resistance, the size of the cross section surface of the specific cooling air route is reduced, and conversely, in order to balance a changing decrease in pressure via the bulk material cooling bed in this manner, so that the specific cooling air quantity is no longer dependent on the respective pressure loss or flow resistance of the cooling air in the respective bulk goods bed zone. The well-known mechanical cooling air flow rate control system operates with a weight-loaded swing flap with a horizontal pivot axle, whereby the swing flap automatically restricts the cooling air inflow, the extent of which depends on the existing pressure and flow conditions. If the existing cooling air regulator, which operates with a purely gravitational operating lever weight with upstream flow body, were arranged below the cooling grid in the cooling air flow of the cooling grid zones, and were not fixed but rather, such as a reciprocating grate cooler for bulk goods transport with regulator, movable, the independent function of the regulator would be disrupted by the reciprocating movement, causing the regulating result to be falsified.

The above-mentioned independently operating cooling air control system of a grate cooler leads to the control of an essentially constant flow volume of cooling air. The common grate cooler control system does not take into account the individual cooling requirements in various zones of the, in practice, very long and wide grate cooler, which cannot optimally respond with a constant control of the cooling air volume flow. Need-driven changes of the cooling air volume flow within the individual zones of the grate cooler during operation are not possible with the common grate coolers.

With the EP-A-0 943 881 it is also known that the conveyor velocity of the grate cooler is regulated depending on the height of the cooling material bed as well as the cooling air flow resistance in the inlet area of the grate cooler. This leads to a homogenization of the cooling material bed. The so-called chamber pressure in the air chambers beneath the cooling grate is generally applied when measuring the flow resistance. As the cooling air chambers arranged successively in cooling direction are large, whereby the air chamber size at the end of the cooler generally increases, the measured chamber pressure, even in connection with the measured height of the bulk material bed, is no longer necessarily representative for the current cooling air requirements within one of the zones of the grate cooler.

SUMMARY OF THE INVENTION

The task of this invention is the operation of a bulk good grate cooler to cool, e.g., hot cement clinker in a process controlled manner in order to ensure that the volume flows of cooling air in all areas of the cooling grate and/or the resident time in the respective zone of the cooling bed can be matched to the cooling requirements occurring in each area.

While the known control procedures of the bulk good grate cooler offer the possibility to keep cooling air volume flow essentially constant in all zones of the cooler, the invented procedure for controlling the operation of a bulk good grate cooler offers the possibility, to supply each zone of the grate cooler, depending on the heat content of the hot bulk goods, with cooling air flow in line with the specific cooling requirement.

According to the invention, a control intervention is carried out during the operation of the grate cooler with respect to the respective local cooling air volume flow and/or with respect to the respective local speed of conveyance of the cooling grid according to the respective bulk good bed height measured per area and/or the bulk good bed temperature and/or the cooling air flow resistance such that if a modification occurs in one or several of the measured parameters, i.e., bed height, bed temperature and through-flow resistance, the respective local cooling air volume flow and/or the conveyance speed of the grate system is altered.

In this manner the local cooling air volume flow can be increased when there is an increase in the parameters bed height and/or bed temperature, and/or through-flow resistance, and conversely, whereas an increase of the bed temperature, especially on the upper side of the bed, may induce a so-called "red river" formation, to reduce the conveyor velocity of the grate system and vice versa.

It is possible to combine the three indicators bulk good bed height, bulk good bed temperature and through-flow resistance, whereby it may involve the measured pressure difference of the specific cooling air flow between lower and upper side of the specific volume flow control system, into one newly combined indicator. However, it is also possible to utilize one or two of the indicators as reference variables and the remaining indicators as correction values for the invention-related control.

The through-flow resistance of the bulk good bed, especially hot clinker beds, is determined by the bed height, granulometry and the bed temperature. A thermo-scanner or a camera equipped with temperature field detectors can provide information on the actual bulk goods temperature. In this manner, all essential indicators relevant to zone-specific cooling are captured, in order for the grate cooler to operate optimally according to cooling requirements.

The requirement-based cooling of the grate cooler can also be realized with a combination of ventilation and conveyor technological measures, i.e., through control interventions on the cooling air volume flow and the conveyor velocity of the grate system in order to align the cooling air volume flow to the cooling quantities occurring in specific zones of the grate cooler. Conveyor velocity is controlled with reciprocating grate coolers via the stroke length and/or the stroke frequency of the movable grate plate sequences. This also applies to a bulk good grate cooler operating by the so-called walking floor principle, with which the individual successively arranged floor elements supporting the cooling good are jointly controlled for forward movement, but rearwardly not jointly, rather they are moved back separately.

With the invention procedure, the pressure difference between the lower side and the upper side of the cooling air control system beneath the cooling grate is measured by the length and the width of the zones distributed on the cooling grate. With a grate cooler that transports the bulk good stepwise by the walking floor principle, the bulk good bed height is measured by the neighboring cooling grate tracks or plates in conveying direction and the indicators are used by activating the drives of the specific grate tracks or plates for targeted transverse distribution of the bulk good bed throughout the entire cooler width. In connection with temperature measurements, especially on the upper side respectively the upper layers of the cooling good bed, the so-called "red river" formation can be suppressed for grate coolers to cool red-hot cement clinker.

Most of the cooling air control systems implemented in the cooling air inflows operate with control characteristics, that especially render an increase of cooling air demand with increased cooling bed height respectively cooling bed temperature, respectively cooling bed through-flow resistance for each specific cooling air flow. A special feature of the invention allows these control characteristics to be altered during the cooling operation by mechanically adjusting the discharge height of the mobile final control elements within the control casing.

BRIEF DESCRIPTION OF THE DRAWINGS

The invention and further features and advantages shall be illustrated in detailed on the basis of the schematic exemplary embodiments.

DETAILED DESCRIPTION OF THE DRAWINGS

Figure 1:
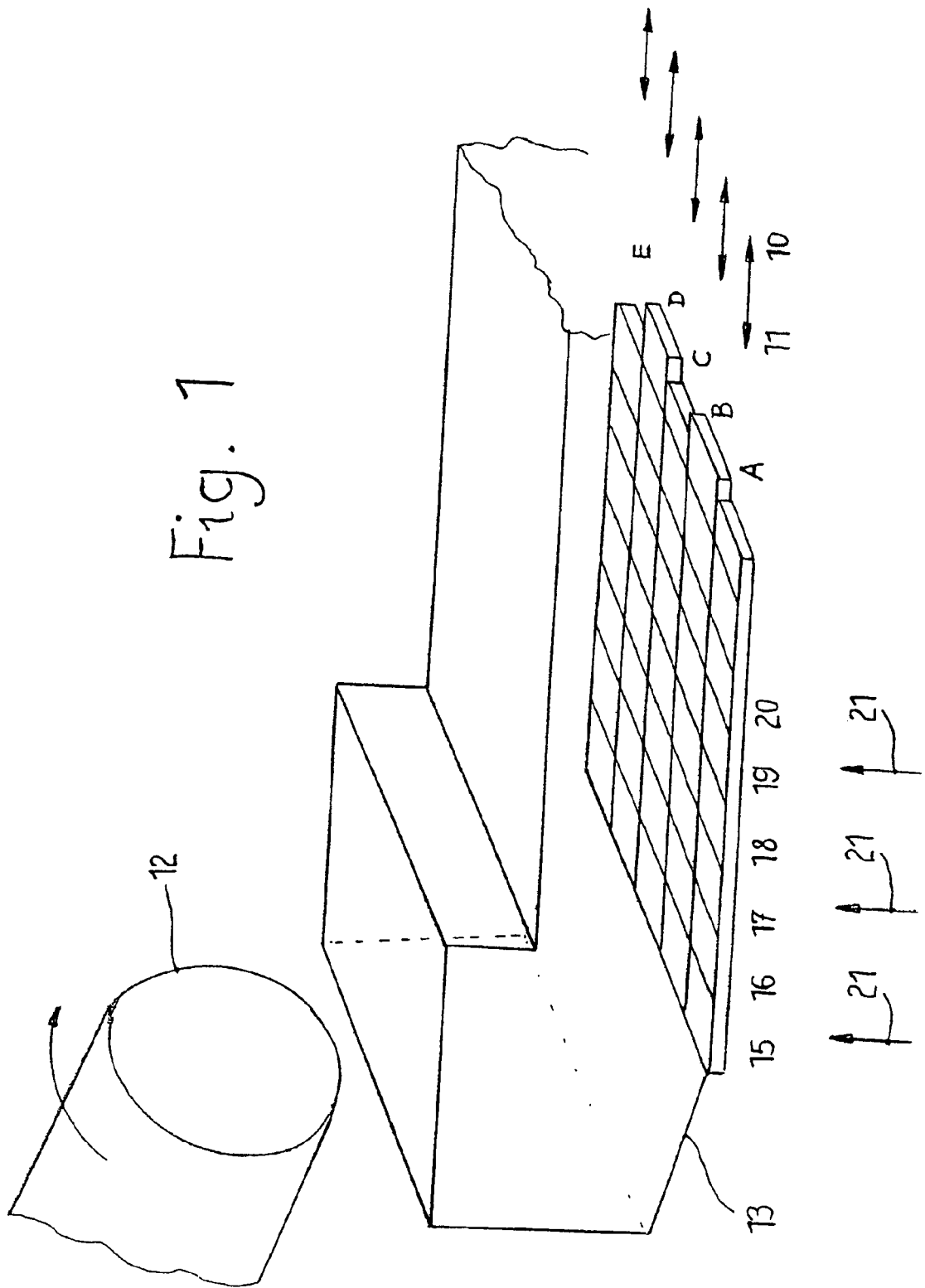
FIG. 1: a schematic perspective view of the inlet area of a grate cooler for cooling hot cement clinker produced in a rotary kiln.

In line with exemplary embodiment of FIG. 1, the cooling grate of the grate cooler is composed of numerous successively arranged cooling grate modules in a chessboard manner. Each module possesses numerous oblong, vat-shaped floor elements arranged next to each other in cooler direction that are independently movable between a pre-stroke position 10 in chilled goods conveyance direction and a return stroke position 11, so that the unembodied chilled good stored on the floor elements, is discharged from the discharge connection of a rotary kiln 12 and entered via a transition system 13, on which reciprocating floor elements, e.g., by the walking floor principle, transport it step-wise through the cooler. The actuation of the individual vat-shaped floor elements of the cooling grate modules is executed from beneath the cooling grate via push frames that are supported by casters to which hydraulic cylinders are attached, in a manner that the floor elements are jointly moved forward, but not jointly, rather they are temporally moved back separately.

The longitudinal tracks or plates of the cooling grate module sequences are identified by the letters A, B, C, D, E, while the grate module cross rows are identified by the numbers 15, 16, 17, 18, 19, 20 etc. The floor elements of all cooling grate modules are constructed as hollow bodies. In the cross section, they display an upper side that supports the cooling good and allows for passing of cooling air from bottom to top and a closed lower side arranged at a distance to prevent cooling good grate sinkage. The lower sides of the floor elements possess numerous longitudinally distributed cooling air vents to which the cooling air controls are flanged, as shown in the exemplary embodiment in FIG. 2.

Figure 2:
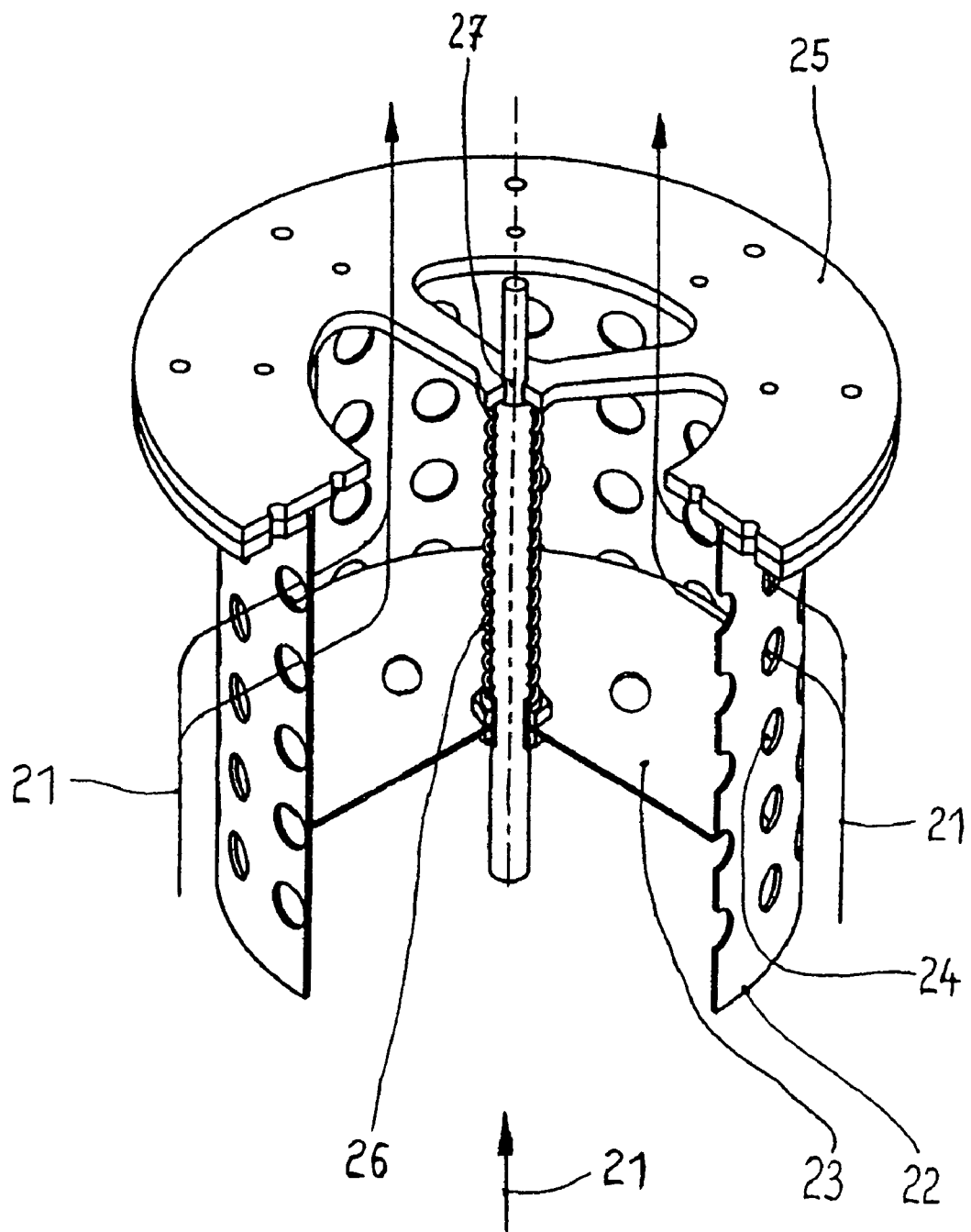
FIG. 2: a cooling air control system from which the front part of the control casing has been cut out in order to allow for proper inspection.

The automatically acting cooling air control system of FIG. 2 possesses a control case 22 and a therein contained internal body 23. The, e.g., disk-shaped or cup-shaped internal body 23 is in opposition to the effects of a reset force, in which the, with cooling air 21 saturated, control case 22 is guided reciprocally and translationally as a final control element. With increasing height of the internal body 23 filled with cooling air within the control case 22, the remaining cross section available for the cooling air decreases, and vice versa.

A change in pressure loss in the cooling air flow above the internal body 23 respectively a change in the pressure difference between the upper and the lower side of the internal body 23 causes an axial shift of the internal body 23 and thus a change in cooling air volume flow. The control case 22 of FIG. 2 possesses numerous vents 24 distributed along the height and the volume of the case, whereby the cooling air can pass through these vents into the inside of the case 22 and then exit the case from its upper side 25, that is flanged onto the lower side of the cooling grate module of FIG. 1. A reset spring 26 can trigger at the center of the internal body 23 functioning as a final control element.

During the operation of the grate cooler, a control intervention is carried out during the operation of the grate cooler with respect to the respective local cooling air volume flow 21 and/or with respect to the respective local speed of conveyance of the cooling grate according to the respective bulk good bed height measured per zone and/or the bulk good bed temperature and/or the cooling air flow resistance such that if a modification occurs in one or several of the measured parameters, i.e., bed height, bed temperature and through-flow resistance, the respective local cooling air volume flow and/or the conveyance speed of the grate system is altered.

The cooling air volume flows in the specific cooling grate zones 15 to 20 and/or the conveyance velocity of the grate cooler are regulated in line with heat content of the bulk good bed in a cooling requirement and process controlled manner. The control characteristics of the cooling air control system 22 portrayed in FIG. 2 can be adjusted and modified so that the preload force of the reset spring 26 supported in the translationary mobile internal body 23 can be changed and adjusted by activating the positioning mechanism 27.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A method of operation of a bulk good grate cooler that transports the bulk good step-wise by the walking floor principle to cool heated bulk goods that are transported from a bulk good inlet connection via conveyors to a chilled goods discharge connection, while a cooling grate and the hot bulk goods distributed on the grate are supplied with cooling air passed from the bottom up, which cooling air flow is regulated by control systems arranged beneath the cooling grate, the control systems comprising a plurality of control system cases each being saturated with cooling air and housing a movable internal body, comprising the steps:
   continuously measuring at least one parameter comprising a bed height of the bulk good, a bed temperature of the bulk good and a cooling air flow resistance through the bulk good bed,
   intervening via a control during the operation of the grate cooler to alter at least one of a local cooling air volume flow and a local speed of conveyance of the bulk good bed on the cooling grate in response to changes in the measurement of the at least one parameter,
   initiating the alteration of the control characteristics of the cooling air volume flow control system by an automatic mechanical change in position of the movable internal body within the control system case in response to a pressure differential within the control case to automatically adjust a variable flow rate of cooling air through the control case towards the cooling grate, and
   measuring the bulk good bed height at neighboring cooling grate planks in a conveying direction and using the height measurements to activate drives of individual grate planks to achieve a targeted transverse distribution of the bulk good bed throughout an entire width of the cooler.

2. The method of claim 1, including the step of regulating at least one of cooling air volume flows of specific cooling grate zones and conveyor velocity of the grate cooler in a process-controlled manner in line with a temperature dependent cooling requirement.

3. The method of claim 1, wherein local cooling air volume flow is increased upon a measurement of an increase of at least one of the parameters of bed height, bed temperature and through-flow resistance and conversely, wherein conveyor velocity is reduced upon a measurement of an increase of bed temperature, and vice versa.

4. The method of claim 1, including the step of altering control characteristics of the cooling air volume flow control system during the cooling operation, whereby the control characteristic reflects an increase in cooling requirements with an increase in at least one of the cooling good bed height, the cooling good bed temperature and an increase in the cooling good through-flow resistance for the specific cooling air flow.

5. The method of claim 4, including the step of applying the control characteristics for the control to maintain constant cooling air volume flows.

6. The method of claim 1, including the step of measuring a pressure difference between a lower side and an upper side of the cooling grate as representative for the cooling air through-flow resistance.

7. A method according to claim 1, wherein the control systems cases each comprise a numerous vents distributed along a height of the case whereby the cooling air can pass through these vents into an inside of the case and exit the case from its upper side.

8. A method according to claim 1, wherein the movable internal body is biased by a spring towards a position providing a maximum flow of cooling air through the control systems case.

9. A method of operation of a bulk good grate cooler that transports the bulk good step-wise by the walking floor principle to cool hot bulk goods that are transported on a cooling grate, comprising the steps,
   supplying cooling air to the cooling grate and the hot bulk goods distributed on the grate from the bottom up,
   regulating the cooling air flow by a control system arranged beneath the cooling grate, the control systems comprising a plurality of control system cases each being saturated with cooling air and housing a movable internal body,
   continuously measuring at least one parameter comprising a bed height of the bulk good, a bed temperature of the bulk good and a cooling air flow resistance through the bulk good bed,
   intervening via the control system during the operation of the grate cooler to alter at least one of a local cooling air volume flow and a local speed of conveyance of the bulk good bed on the cooling grate in response to changes in the measurement of the at least one parameter,
   initiating the alteration of the control characteristics of the cooling air volume flow control system by an automatic mechanical change in position of the movable internal body within the control system case in response to a pressure differential within the control case to automatically adjust a variable flow rate of cooling air through the control case towards the cooling grate, and
   measuring the bulk good bed height at neighboring cooling grate planks in a conveying direction and using the height measurements to activate drives of individual grate planks to achieve a targeted transverse distribution of the bulk good bed throughout an entire width of the cooler.

10. The method of claim 9, including the step of regulating at least one of cooling air volume flows of specific cooling grate zones and conveyor velocity of the grate cooler in a process-controlled manner in line with a temperature dependent cooling requirement.

11. The method of claim 9, wherein local cooling air volume flow is increased upon a measurement of an increase of at least one of the parameters of bed height, bed temperature and through-flow resistance.

12. The method of claim 9, wherein local cooling air volume flow is decreased upon a measurement of a decrease of at least one of the parameters of bed height, bed temperature and through-flow resistance.

13. The method of claim 9, wherein conveyor velocity is reduced upon a measurement of an increase of bed temperature.

14. The method of claim 9, wherein conveyor velocity is increased upon a measurement of a decrease of bed temperature.

15. The method of claim 9, including the step of altering control characteristics of the cooling air volume flow control system during the cooling operation, whereby the control characteristic reflects an increase in cooling requirements with an increase in at least one of the cooling good bed height, the cooling good bed temperature and an increase in the cooling good through-flow resistance for the specific cooling air flow.

16. The method of claim 15, including the step of applying the control characteristics for the control system to maintain constant cooling air volume flows.

17. A method according to claim 9, wherein the control systems cases each comprise a numerous vents distributed along a height of the case whereby the cooling air can pass through these vents into an inside of the case and exit the case from its upper side.

18. A method according to claim 9, wherein the movable internal body is biased by a spring towards a position providing a maximum flow of cooling air through the control systems case.

19. A method of operation of a bulk good grate cooler to cool hot bulk goods that are transported on a cooling grate, comprising the steps, supplying cooling air to the cooling grate and the hot bulk goods distributed on the grate from the bottom up, regulating the cooling air flow by a control system, continuously measuring at least one parameter comprising a bed height of the bulk good, a bed temperature of the bulk good and a cooling air flow resistance through the bulk good bed, intervening via the control system during the operation of the grate cooler to alter at least one of a local cooling air volume flow and a local speed of conveyance of the bulk good bed on the cooling grate in response to changes in the measurement of the at least one parameter, and measuring a pressure difference between a lower side and an upper side of the cooling grate as representative for the cooling air through-flow resistance.

* * * * *